United States Patent [19]

Wakasugi

[11] Patent Number: 5,459,629
[45] Date of Patent: Oct. 17, 1995

[54] COMBINED MAGNETIC HEAD HAVING SLIDER PROVIDED WITH ABUTMENT RIDGES FOR MAINTAINING COMBINED MAGNETIC CORE IN REQUIRED POSITION

[75] Inventor: Makoto Wakasugi, Tanashi, Japan

[73] Assignee: Citizen Watch Co., Ltd., Tokyo, Japan

[21] Appl. No.: 87,820

[22] PCT Filed: Nov. 13, 1992

[86] PCT No.: PCT/JP92/01488

§ 371 Date: Jul. 7, 1993

§ 102(e) Date: Jul. 7, 1993

[87] PCT Pub. No.: WO93/10524

PCT Pub. Date: May 27, 1993

[30] Foreign Application Priority Data

Nov. 13, 1991 [JP] Japan ................................. 3-297503

[51] Int. Cl.⁶ .......................... G11B 5/105; G11B 5/265
[52] U.S. Cl. ........................................................... 360/104
[58] Field of Search ................................... 360/104, 109

[56] References Cited

U.S. PATENT DOCUMENTS 4,297,735 10/1981 Eppich .................................... 360/104
4,605,978 8/1986 Zeavin .................................... 360/104
4,750,066 6/1988 Kunze .................................... 360/104
5,270,523 12/1993 Chang et al. ....................... 360/104 X

FOREIGN PATENT DOCUMENTS 49-60518 6/1974 Japan .
3212809 9/1991 Japan .
5135322 6/1993 Japan .

Primary Examiner—John H. Wolff
Attorney, Agent, or Firm—Spensley Horn Jubas & Lubitz

[57] ABSTRACT

In a combined magnetic head of the present invention, a slider (20) for holding a combined magnetic core (10) has a couple of anti-slant noses (25) whose confronting surfaces each include an abutment ridge (26) extending along the height of the anti-slant nose and intended to be abutted against the combined magnetic core which has been inserted into a core slit (22) of the slider. This construction enables the interval between the couple of noses to be accurately adjusted in conformity with the thickness of the combined magnetic core at the time of integral molding of the slider. As a result, a secure prevention of the slant of the combined magnetic core can be accomplished to ensure an accurate positioning of the combined magnetic core with respect to the slider.

4 Claims, 6 Drawing Sheets

COMBINED MAGNETIC HEAD HAVING SLIDER PROVIDED WITH ABUTMENT RIDGES FOR MAINTAINING COMBINED MAGNETIC CORE IN REQUIRED POSITION

TECHNICAL FIELD

The present invention relates to a magnetic head of combined type consisting of a recording/reproducing head and an erasing head, for use in a magnetic storage device such as a floppy disk drive, and more particularly, is directed to construction of a slider in which a combined magnetic core of the combined magnetic head can be accurately positioned and held in place.

BACKGROUND ART

In a conventional magnetic storage device such as a floppy disk drive, there has been employed a magnetic head of a combined type consisting of a recording/reproducing head for the execution of recording and reproducing with respect to a magnetic recording medium such as a floppy disk and an erasing head for erasing a track on the magnetic recording medium on which information had been recorded by the recording/reproducing head.

Such type of combined magnetic head comprises a combined magnetic core, and a slider for holding the combined magnetic core, the combined magnetic core being in sliding contact with the surface of a magnetic recording medium in cooperation with the slider. The combined magnetic core includes a recording/reproducing core and an erasing core each consisting of an outer core and an inner core, the recording/reproducing core being secured to the erasing core by a glass adhesive in such a manner that respective inner cores confront each other. The recording/reproducing core of the combined magnetic core has at its one end a recording/reproducing gap, while the erasing core has at its one end an erasing gap.

On the other hand, the slider is integrally molded into a substantially rectangular container having a bottom including a surface in sliding contact with the magnetic recording medium. The slider further includes at its bottom a core slit adapted to receive the combined magnetic core and opening to the sliding contact surface.

The combined magnetic core is inserted into the core slit of the slider and is held in place and securely fastened thereto using a sealing glass, for example, in such a manner that a recording gap and an erasing gap are exposed to the sliding contact surface. A recording/reproducing coil assembly and an erasing coil assembly are mounted to the recording/reproducing core and the erasing core, respectively, of the combined magnetic core which is firmly held within the slider in this manner, and then a back core is mounted to the open end of the combined magnetic core. The slider which has thus accommodates the combined magnetic core, the coil assemblies, and the back core is then attached to a carriage arm by way of a gimbal spring.

It is to be noted that such type of combined magnetic head must be fabricated with a significantly high accuracy so as to ensure a high-density recording. Accordingly, the combined magnetic core must be accurately positioned and held within the core slit of the slider.

In a combined magnetic head which has been already proposed by the present inventors (Japanese Patent Application No. 3-297502), a plurality of positioning protrusions for the determination of the position of the combined magnetic core are formed on the inner surface of the core slit of the slider, and a pair of anti-slant noses to prevent slanting or tilting, of the combined magnetic core are formed on side walls extending in the longitudinal direction of the core slit of the slider, respectively, each nose confronting the other. The anti-slant noses projecting toward the core slit from the middle of the inner surfaces of the slider side walls serve in cooperation to prevent slanting of the combined magnetic core by clamping the respective inner cores of the recording/reproducing core and the erasing core of the combined magnetic core.

It is however very difficult to integrally mold the slider with high accuracy in such a manner that the confronting surfaces of the anti-slant noses resting on both sides of the slider are brought into close contact with the combined magnetic core without any gap since the heat shrinkage percentage of the material is relatively large and the core slit is subjected to a deformation due to the weight of the slider itself at the time of shrinkage. As a result, the combined magnetic core which has been inserted into the core slit undergoes an inclination which may prevent the accurate positioning of the combined magnetic core with respect to the slider.

Moreover, in proportion to the area of the confronting surfaces of the respective anti-slant noses of the integrally molded slider, there is an increase in the frequency of occurrence of micro-protuberances which are created thereon by foreign matter. Such micro-protuberances may block the insertion of the combined magnetic core between the two noses.

It is therefore an object of the present invention to overcome the deficiencies involved in such conventional combined magnetic head and to provide a combined magnetic head having a slider within which a combined magnetic core can be accurately positioned and held in place.

DISCLOSURE OF THE INVENTION

In a combined magnetic head of the present invention, a slider for holding a combined magnetic core has a pair of anti-slant noses having confronting surfaces, with each nose including an abutment ridge extending along the height of the anti-slant nose and intended to abut against the combined magnetic core which has been inserted into a core slit of the slider. This construction enables the interval between the couple of noses to be accurately adjusted in conformity with the thickness of the combined magnetic core at the time of integral molding of the slider. As a result, a secure prevention of the slant of the combined magnetic core can be accomplished to ensure an accurate positioning of the combined magnetic core with respect to the slider.

BEST MODE FOR CARRYING OUT THE INVENTION

An embodiment of a combined magnetic head constructed in accordance with the present invention will now be described with reference to the accompanying drawings.

Figure 1:
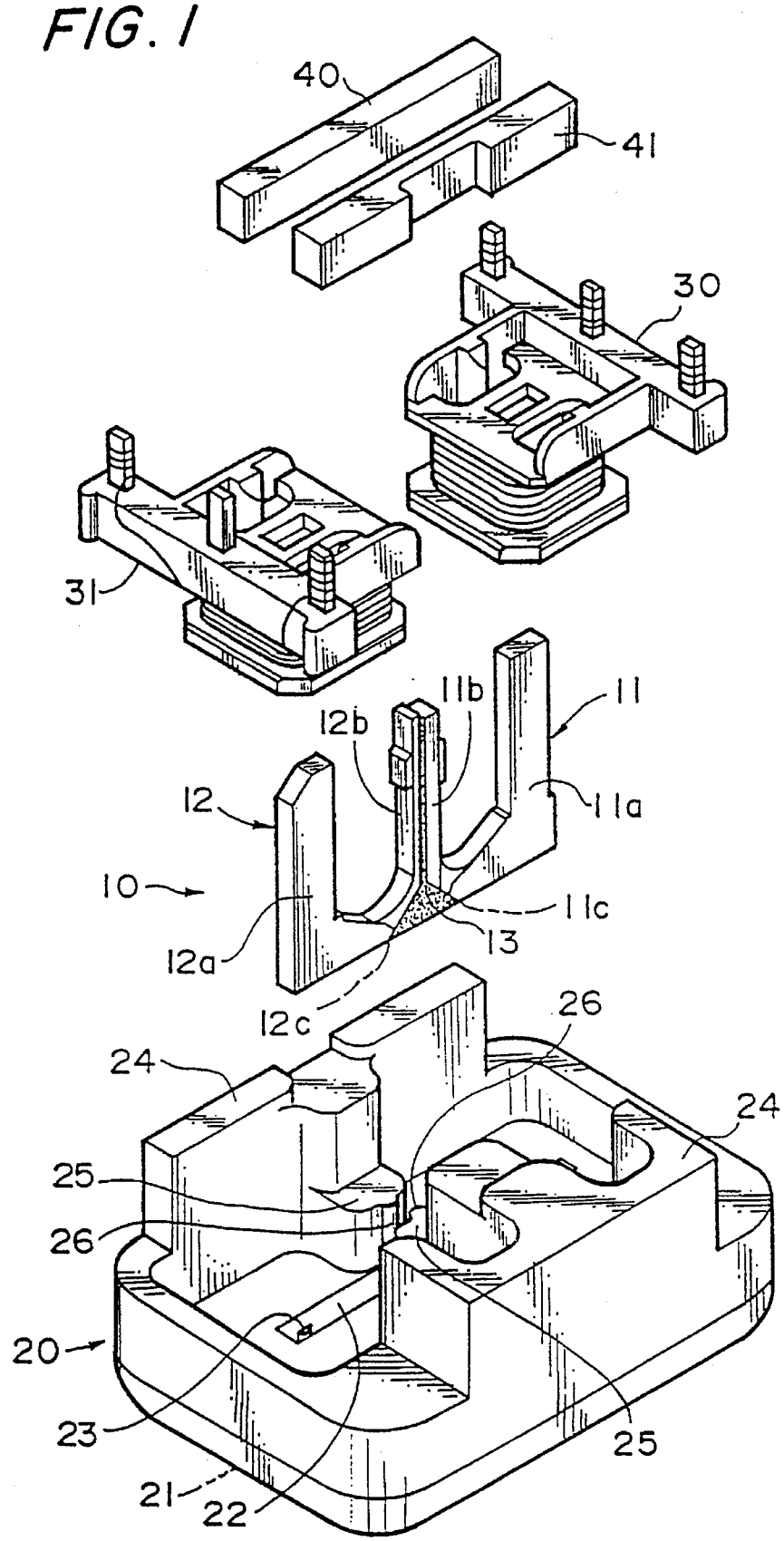
FIG. 1 is an exploded perspective view of a preferred combined magnetic head embodying the present invention.
Figure 2:
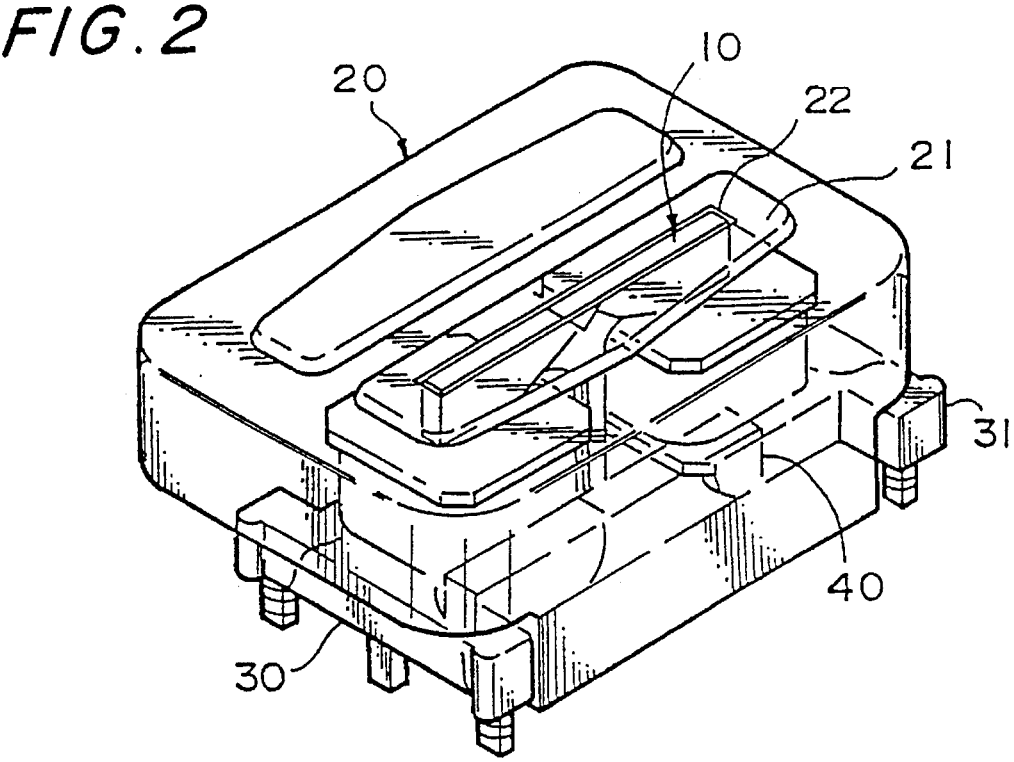
FIG. 2 is an assembled perspective view of the combined magnetic head viewed from the side of a sliding contact surface.

Referring first to FIGS. 1 and 2, there is shown the combined magnetic head of the present invention, in exploded perspective and assembled perspective views, respectively, which comprises a combined magnetic core 10, a slider 20 for holding the combined magnetic core 10, a recording/reproducing coil assembly 30 and an erasing coil assembly 31 each mounted on the combined magnetic core 10, and a pair of back cores 40 and 41 for closing the open end of the combined magnetic core 10. It is to be noted that according to the present invention that the pair of back cores 40 and 41 may be replaced with a single shared core.

The composite magnetic core 10 comprises a recording/reproducing core 11 consisting of an outer core 11a and an inner core 11b which in combination form a substantial U, and an erasing core 12 consisting of an outer core 12a and an inner core 12b also combined to form a substantial U, the cores 11 and 12 being integrated with each other using a glass adhesive with the inner cores 11b and 12b confronting each other. A glass section 13 is comprised of the glass adhesive serving to integrate the recording/reproducing core 11 with the erasing core 12. At the lower end of the combined magnetic core 10, there are a recording/reproducing gap 11c extending from the outer core 11a of the recording/reproducing core 11 to the inner core 11b thereof to execute recording and reproducing with respect to a magnetic recording medium not shown, and an erasing gap 12c extending from the outer core 12a of the erasing core 12 to the inner core 12b thereof to erase information stored on the magnetic recording medium.

Figure 3:
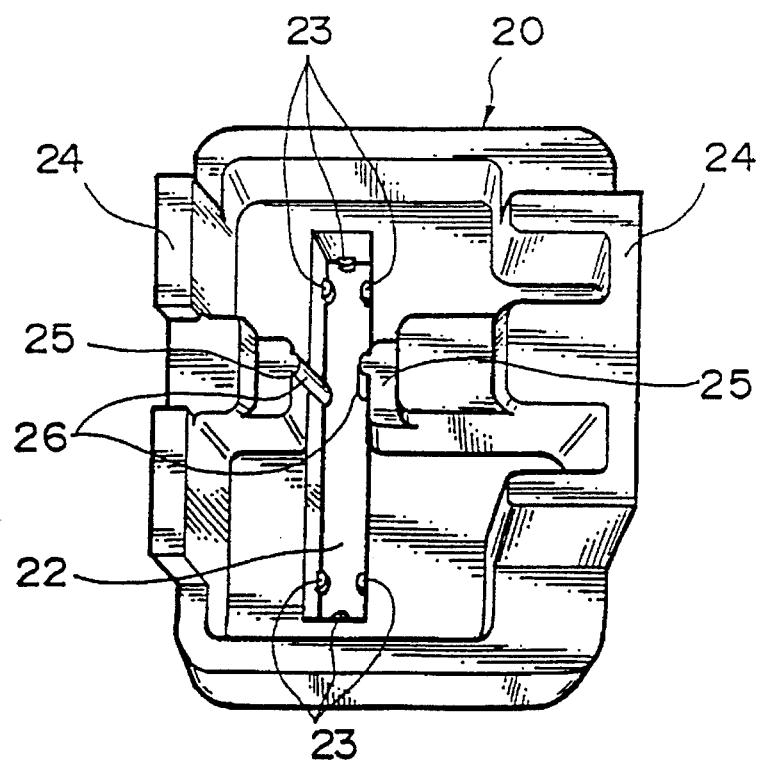
FIG. 3 is a perspective view depicting the interior of a slider.

As is apparent from FIG. 3 showing the interior of the slider 20 in perspective view, as well as from FIG. 1, the slider 20 is integrally molded to constitute a substantially rectangular container which has a bottom including a surface 21 in sliding contact with the magnetic recording medium and a core slit 22 opening to the sliding contact surface 21 and intended to receive the combined magnetic core 10. The core slit 22 has an inner surface provided with a plurality of positioning protrusions 23 for determining the position of the combined magnetic core 10 to be inserted. For example, there are two protrusions 23 on each of the long sides of the core slit 22 and one protrusion 23 on each of its short sides. It is also to be noted in this embodiment that the positioning protrusions 23 are formed only in the vicinity of the sliding contact surface 21. The slider 20 further has a pair of side walls 24 longitudinally extending along the core slit 22. In a region between their ends, the side walls 24 have inner surfaces which project so as to define a pair of anti-tilt noses 25 each confronting the other. These noses 25 act to clamp the inner cores 11b and 12b of the recording/reproducing core 11 and the erasing 12 core, respectively, constituting the combined magnetic core 10 which is inserted into the core slit 22 formed in the slider 20, to thereby prevent the combined magnetic core 10 from tilting.

This combined magnetic head is further characterized in that the noses 25 of the slider 20 each have at their respective confronting surfaces an abutment ridge 26 extending along the height of the nose 25 and intended to abut against the combined magnetic core 10. The abutment ridges 26 in this embodiment are each elongated from the upper end of the confronting surface of the nose 25 to the lower end of the inner surface of the core slit 22.

A procedure of assembling this combined magnetic head comprises the steps of inserting the combined magnetic core 10 into the core slit 22 of the slider 20 in such a manner that the combined magnetic core 10 is fixedly held therein with its recording/reproducing gap 11c and erasing gap 12c being exposed to the sliding contact surface 21 of the slider 20, fitting the recording/reproducing coil assembly 30 and the erasing coil assembly 31 onto the outer cores 11a and 12a, respectively, of the recording/reproducing 11 core and erasing 12 core, respectively, of the fixedly held combined magnetic core 10, and mounting the pair of back cores 40 and 41 onto the upper open end of the combined magnetic core 10 in a clamping manner. Then the combined magnetic core 10 is firmly secured to the slider 20 by filling in the gap, formed between the inner surface of the core slit 22 and the combined magnetic core 10 by virtue of the positioning protrusions 23 with a sealing glass, for example. In this way, the combined magnetic core 10, the core assemblies 30 and 31 and the back cores 40 and 41 are accommodated within the slider 20 which is in turn attached to a carriage arm (not shown) with the aid of a gimbal spring (not shown).

In the combined magnetic head having the above-described construction, the insertion of the combined magnetic core 10 into the core slit 22 of the slider 20 allows the combined magnetic core 10 to abut against the positioning protrusions 23 formed on the inner surface of the core slit 22 and against the abutment ridges 26 provided on the confronting surfaces, respectively, of the noses 25, so that the combined magnetic core 10 can be positioned within the core slit 22 by the positioning protrusions 23 and prevented from tilting by the presence of the abutment ridges 26.

Thus, the employment of such arrangement, in which the combined magnetic core 10 is brought into contact with the abutment ridges 26 formed on the confronting surfaces of the noses 25 of the slider 20 without permitting direct contact with the confront surfaces thereof, enables the interval between the two noses 25 to be more accurately adjusted in accordance with the thickness of the combined magnetic core 10 at the time of integral molding of the slider 20.

Furthermore, a markedly smaller surface area of the abutment ridges 26, in comparison with the area of the confronting surfaces of the noses 25, results in a much lower frequency of occurrence of micro-protuberances arising from foreign matter which may be mixed into the material of the slider, thereby ensuring a smooth insertion of the combined magnetic core 10 into between the two noses 25 without being blocked by the minute protuberances.

Moreover, the extension of the abutment ridges 26 from the upper end of the confronting surfaces of the noses 25 to the lower end of the inner surface of the core slit 22, as seen in this embodiment, allows the abutment ridges 26 to serve also as protrusions for positioning the combined magnetic core 10 within the core slit 22.

On the contrary, what is required on the positioning protrusions 23 formed on the inner surface of the core slit 22 is only to be of a size sufficient to position the combined magnetic core 10 within the core slit 22, and hence the positioning protrusions 23 in this embodiment are provided on the inner surface of the core slit 22 exclusively in the region of the sliding contact surface 21 so that the combined magnetic core 10 which has been introduced into the core slit 22 can be positioned at its lower end. This enables a more accurate adjustment in the length of the positioning protrusions 23 in conformity with the dimensions of the combined magnetic core 10 upon the integral molding of the slider 20. This further leads to a reduction in the surface area of the positioning protrusions 23 to greatly lower the frequency of occurrence of micro-protuberance caused by foreign matter to consequently ensure a smooth insertion of the combined magnetic core 10 into the core slit 22. The protrusions 23 and the abutment ridges 26 may be formed on at least one side of the inner surface of the core slit 22.

The slider 20 may be made of a non-magnetic material such as ceramic, for example. In such case, however, the outer surface of the slider 20 must be provided with a shield in order to eliminate the influence of an external magnetic field to be applied to the inner combined magnetic core 10. Therefore, the slider 20 may be integrally molded from a magnetic material such as MnZn ferrite, for example, to use the slider 20 itself as the shield for the combined magnetic core 10, which contributes to a reduction in the number of components as well as the size of the combined magnetic head.

Provided that the slider 20 is molded from a magnetic material as described above, the slider 20 must be magnetically insulated from the combined magnetic core 10. One way to provide such insulation is to non-magnetize the surface of the positioning protrusions 23 and the abutment ridges 26 formed on the slider 20 and intended to abut against the combined magnetic core 10. Alternatively, the positioning protrusions 23 and the abutment ridges 26 of the slider 20 may abut against the glass section 13 of the combined magnetic core 10 which has been inserted into the core slit 22, the glass section 13 being comprised of a glass adhesive serving to integrate the recording/reproducing core 11 with the erasing core 12, thereby magnetically insulating the slider 20 from the combined magnetic core 10.

Figure 4:
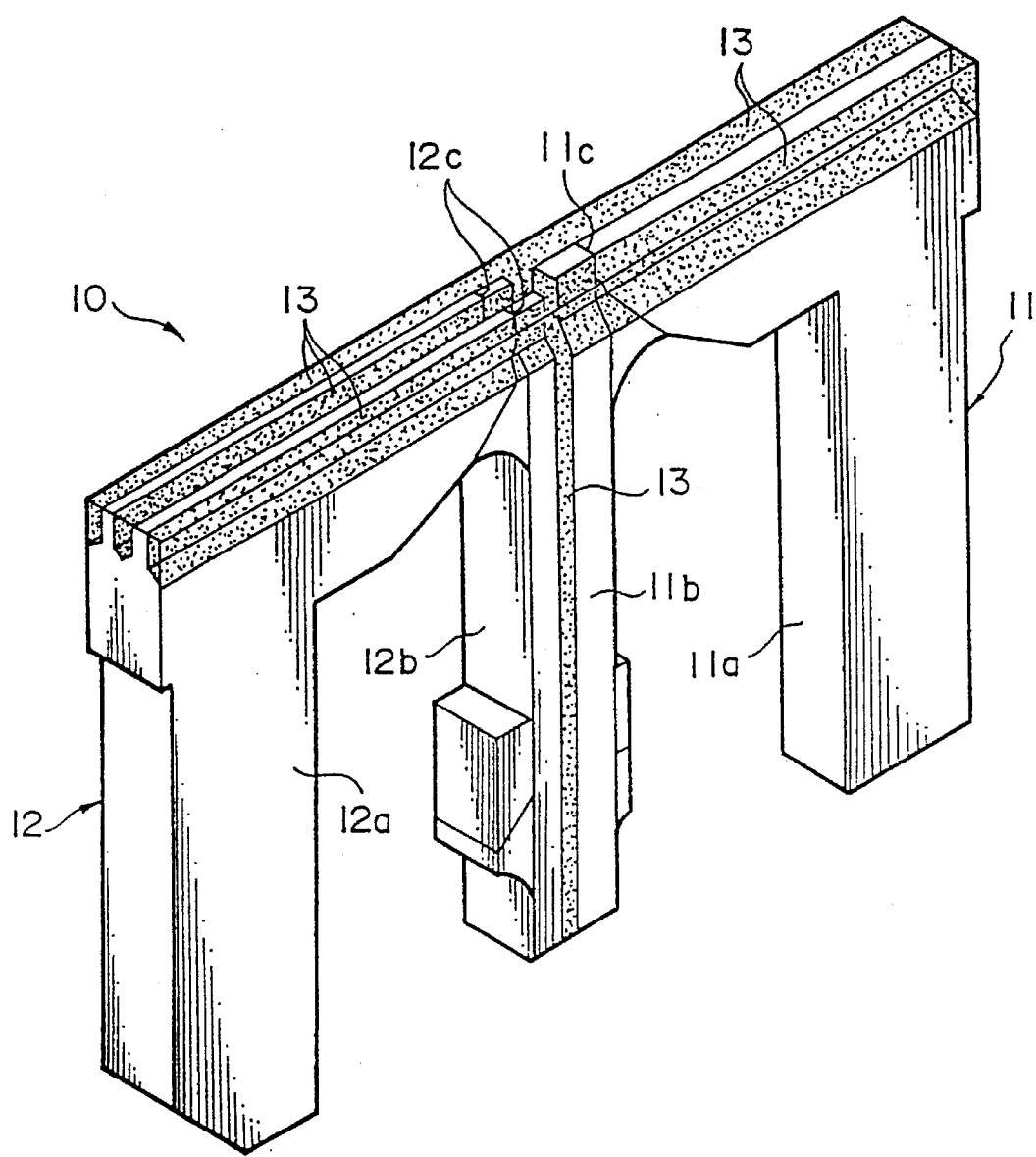
FIG. 4 is perspective view depicting the construction of the combined magnetic core.
Figure 5:
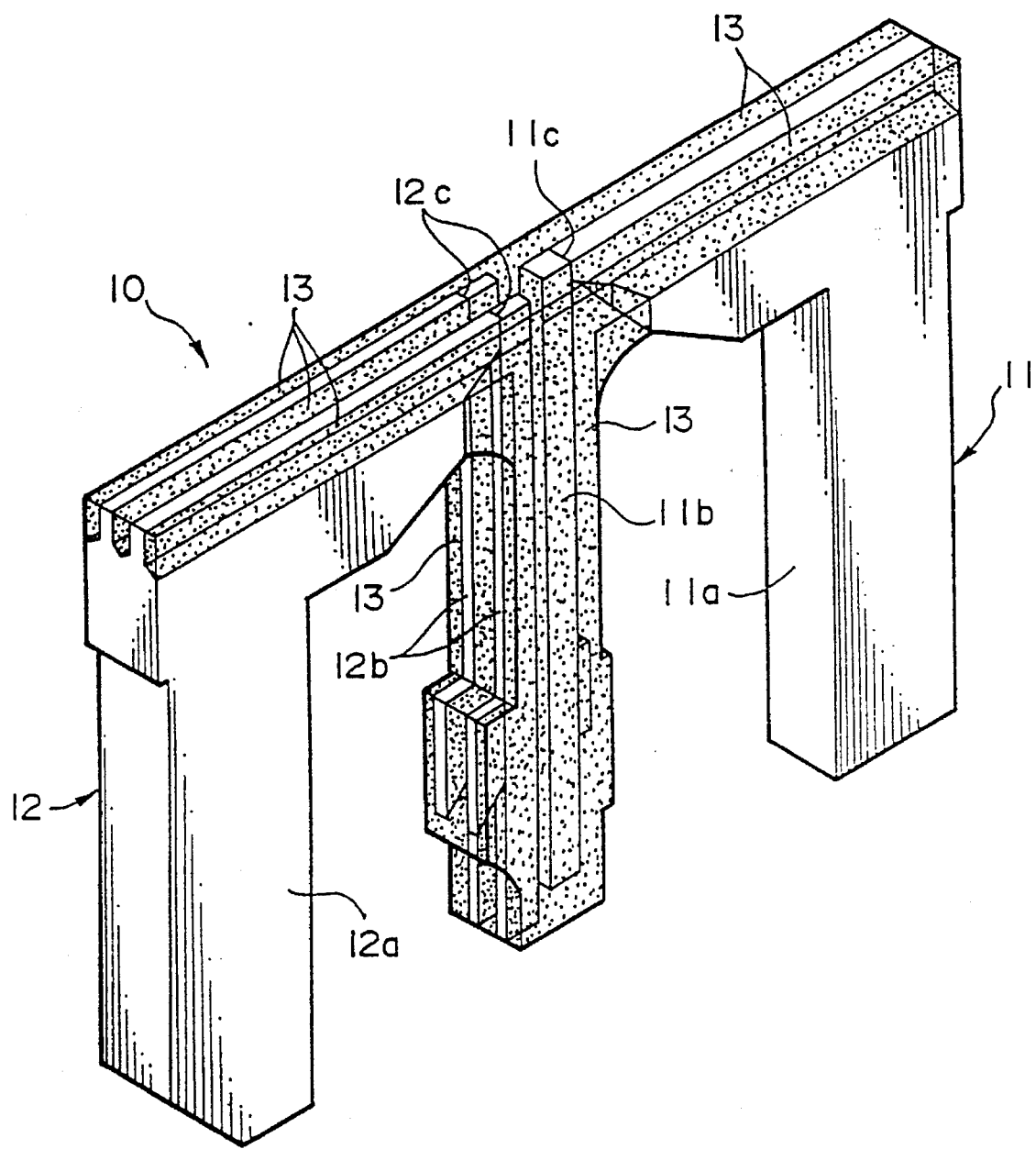
FIG. 5 is perspective view each depicting the construction of the combined magnetic core.

In order to cause the positioning protrusions 23 and the abutment ridges 26 of the slider 20 to abut against the glass section 13 of the combined magnetic core 10, as shown in FIGS. 4 and 5 in perspective views, the glass section 13 should be provided not only on the inner cores 11b and 12b and the gaps 11c and 12c of the recording/reproducing 11 and erasing 12 cores, respectively, but also over the entire end portion of the combined magnetic core 10 to be inserted into the core slit 22 of the slider 20.

Figure 6:
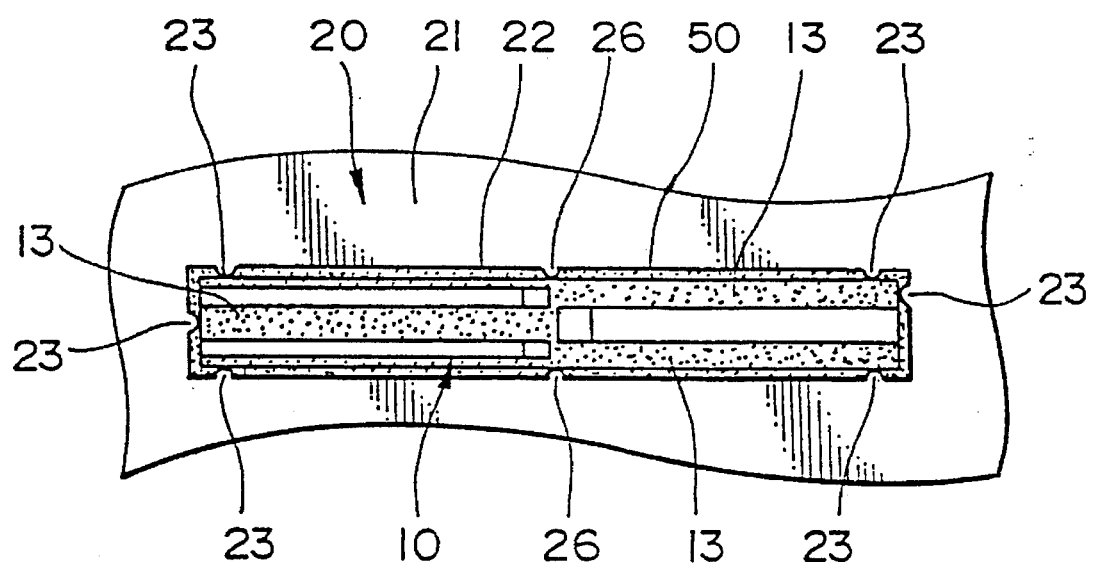
FIG. 6 is a top plan view of a principal part on the side of the sliding contact surface in which positioning protrusions and abutment ridges of the slider abut against a glass section of the combined magnetic core.

Turning next to FIG. 6, there is shown, in plan view of the principal part, the arrangement of the positioning protrusions 23 and the abutment ridges 26 corresponding to the glass section 13 of the combined magnetic core 10, which enables the combined magnetic core 10 to be firmly held within the core slit 22 of the slider 20 made of a magnetic material in a magnetically insulated manner. Then the gap defined between the inner surface of the core slit 22 and the combined magnetic core 10 is to be filled in with a sealing glass 50, for example, to securely fasten the combined magnetic core 10 to the core slit 22. This manner of insulation eliminates the necessity of providing the non-magnetizing step, and hence simply and at a lower cost can present a combined magnetic head having a shielded construction.

Figure 7:
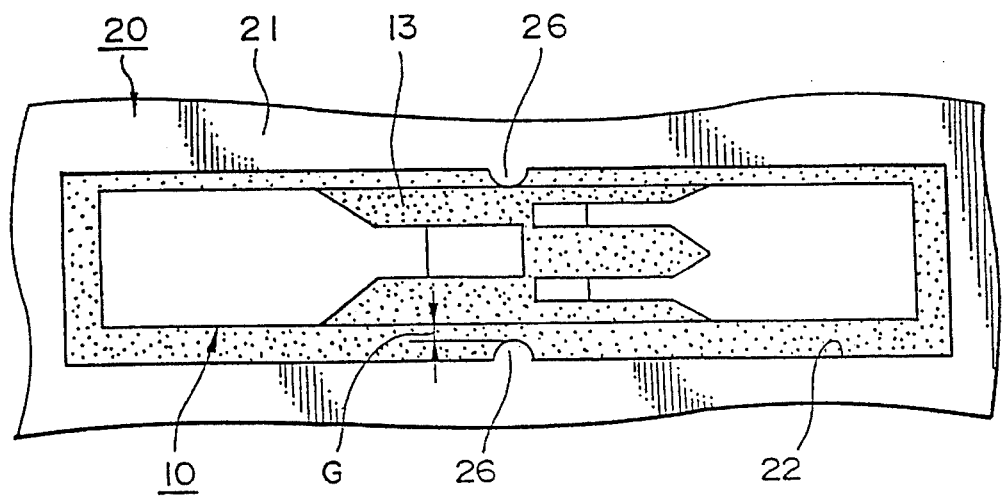
FIG. 7 is a top plan view of the principal part of the slider having a core slit whose inner surface is ground to remove positioning protrusions.

Although the plurality of positioning protrusions 23 are exposed on the surface of the slider 20 in FIG. 6, it is also natural in the present invention that the positioning protrusions 23 may be removed from the surface by means of grinding. FIG. 7 depicts a configuration of the surface of the slider 20 from which the positioning protrusions 23 are removed by finish of grinding to predetermined dimensions while chamfering the surface after the integration of combined magnetic core 10 into the slider 20. As is apparent from this enlarged view, the positioning function of the positioning protrusions 23 is not to be adversely affected by the presence of the abutment ridges 26 since one side of the combined magnetic core 10 is in contact with one of the abutment ridges 26 but the other side thereof is separated from the other abutment ridge 26 by a gap G.

Figure 8:
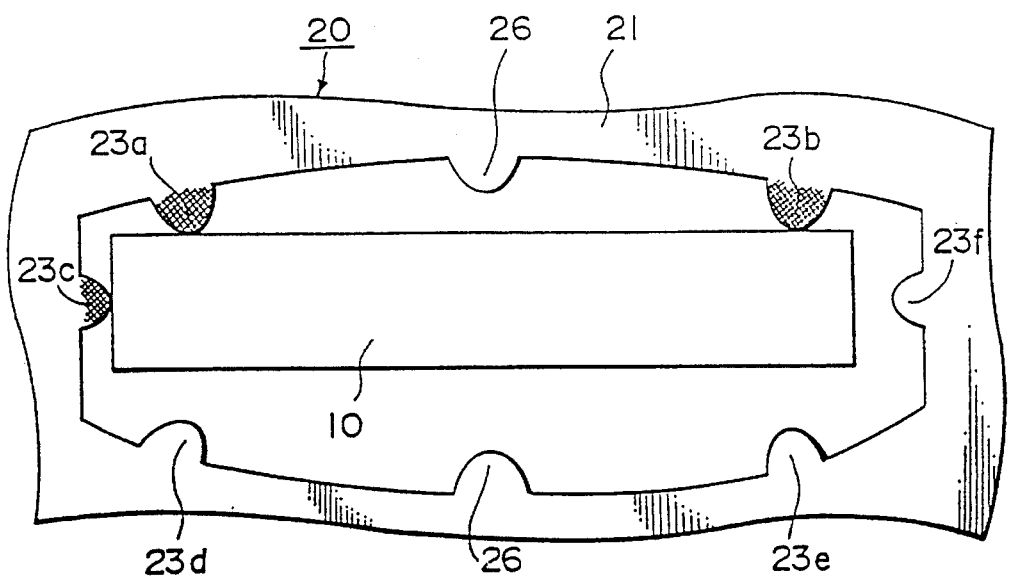
FIG. 8 is an explanatory view illustrating a deformation of the core slit of the slider.

FIG. 8 illustrates in an exaggerated manner a relationship between the positioning protrusions 23 and the abutment ridges 26, in which there is shown the actual core slit 22 subjected to a bulge-like deformation due to heat shrinkage when molding the slider 20. Hence, the positioning protrusions 23 provided on the core slit 22 in the vicinity of the ends of the combined magnetic core 10 are partly allowed to come into intimate contact with the core 10 while the abutment protrusions 26 substantially corresponding to the middle of the core 10 in the direction of its longitudinal axis are forced to be separated from the core 10 due to the bulge-like deformation so as not to prevent the positioning function of the positioning protrusions 23 from being impaired. The protrusions 23a, 23b and 23c which have been hatched in FIG. 8 contribute to the positioning of the combined magnetic core 10.

Referring back to FIG. 7, the abutment ridges 26 of the slider 20 are at their lower parts allowed to come into contact with the I-bar of the core 10 to lessen a magnetic resistance which may appear when molding the slider 20 from a magnetic material through the contact with the I-bar, thereby in particular improving the characteristics of the high-density read/write head.

In the case where the positioning protrusions 23 on the inside of the core slit 22 are exclusively formed in the vicinity of the sliding contact surface 21 as in this embodiment, there is no need to provide the glass section 13 extending over the entire end portion of the combined magnetic core 10 since the positioning protrusions 23 to come into contact with the core 10 can be removed by evenly grinding the sliding contact surface 21 of the slider 20 including the positioning protrusions 23 after the assembly of the head even when the slider 20 is molded from a magnetic material.

According to the present invention, as described above, the combined magnetic core 10 can be positioned with respect to the slider 20 by virtue of the positioning protrusions 23, and hence only parts corresponding to the positioning protrusions 23 may be configured at a high accuracy when producing a mold, thus realizing an extremely simple fabrication of the slider into a head gimbal assembly. In other words, although a plurality of mold adjustments are required for the manufacture of the slider mold, remarkably easy adjustments are accomplished by the present invention in which the parts to be adjusted are limited only to the parts corresponding to the positioning protrusion 23, not the entire core slit as in the conventional manner. Thus, by maintaining the relationship between the slider and the combined magnetic core at a high accuracy in this manner, the position of the core can be determined based on the configuration of the slider when loading the slider into the head gimbal assembly, which advantageously eliminates the need to fabricate while measuring the core as in the past.

INDUSTRIAL APPLICABILITY

As described hereinabove, the combined magnetic head in accordance with the present invention can be fabricated with markedly high accuracy since its combined magnetic core is accurately positioned and held within the core slit of the slider. Therefore, this combined magnetic head is capable of effecting high-density storage suitable for a magnetic storage device such as a floppy disk drive.

What is claimed is:

1. A combined magnetic head, comprising:

a combined magnetic core (10) comprising a recording/reproducing core unit and an erasing core unit, each core unit including an outer core and an inner core, said recording/reproducing core unit being fixed with said erasing core unit by a glass section in such a manner that said inner core of said recording/reproducing core unit confronts said inner core of said erasing core unit; and a slider (20) integrally molded into a box-shape and having a slide surface (21) for sliding contact with a recording medium, and a core slit (22) opening to said slide surface, said combined magnetic core being inserted into, and being received and held in said core slit;

said core slit of said slider having an inner surface at least one side of which includes a plurality of positioning protrusions (23) for positioning said combined magnetic core which has been inserted into said core slit;

said core slit having a first length, and said slider having first and second side walls each of said side walls being disposed at a respective side of said core slit and extending along said first length of said core slit, each of said side walls including a nose part (25) which has a height dimension perpendicular to said slide surface of said slider and which is disposed for retaining said combined magnetic core in a predetermined position by preventing said combined magnetic core from tilting away from the predetermined position by supporting said inner core of said recording/reproducing core unit and said inner core of said erasing core unit, said nose part of said first side wall having a surface and said nose part of said second side wall having a surface which faces said surface of said nose part of said first side wall;

wherein said surface of each said nose part has an abutment ridge which extends in the direction of said height dimension and which abuts against said combined magnetic core.

2. A combined magnetic head according to claim 1 wherein:

said slider is made of a magnetic material;

said glass section (13) is made of a glass adhesive which secures said recording/reproducing core unit and said erasing core unit together; and said plurality of positioning protrusions and each said abutment ridge abut against said glass section.

3. A combined magnetic head according to claim 1, wherein said abutment ridge of each said nose part of said slider extends across the inner surface of said core slit.

4. A combined magnetic head according to claim 1 or 3, wherein said plurality of positioning protrusions on the inner surface of said core slit of said slider are exclusively provided in the vicinity of said slide surface of said slider.

* * * * *